(12) United States Patent
Eismann et al.

(10) Patent No.: US 9,555,683 B2
(45) Date of Patent: Jan. 31, 2017

(54) FOUR-POINT LINK

(75) Inventors: Jens Eismann, Melle (DE); Matthias Quaing, Emsbueren (DE); Eike Helm, Diepholz (DE); Holger Bublies, Osnabruck (DE); Matthias Gercke, Affinghausen (DE); Thomas Eifflaender, Munich (DE); Daniel Wolf, Friedrichshafen (DE); Markus Steffens, Winnweiler (DE); Frank Anna, Blieskastel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 30 days.

(21) Appl. No.: 14/234,208

(22) PCT Filed: Jun. 22, 2012

(86) PCT No.: PCT/EP2012/062134
§ 371 (c)(1),
(2), (4) Date: Aug. 28, 2014

(87) PCT Pub. No.: WO2013/013912
PCT Pub. Date: Jan. 31, 2013

(65) Prior Publication Data
US 2015/0158361 A1    Jun. 11, 2015

(30) Foreign Application Priority Data
Jul. 22, 2011    (DE) .................. 10 2011 079 654

(51) Int. Cl.
*B60G 9/02*    (2006.01)
*B60G 7/00*    (2006.01)
(Continued)

(52) U.S. Cl.
CPC ................. *B60G 9/02* (2013.01); *B60G 7/001* (2013.01); *B60G 9/00* (2013.01); *B60G 9/022* (2013.01);
(Continued)

(58) Field of Classification Search
CPC ..... B60G 9/00; B60G 7/001; B60G 2206/121; B60G 2200/345; B60G 2206/8101
See application file for complete search history.

(56) References Cited

U.S. PATENT DOCUMENTS 3,047,306 A * 7/1962 Easton ......................... 280/81.6
5,133,575 A * 7/1992 Zantinge et al. .......... 280/6.159
(Continued)

FOREIGN PATENT DOCUMENTS

DE    295 06 571 U1    6/1995
DE    195 01 508 C1    4/1996
(Continued)

OTHER PUBLICATIONS

German Search Report Corresponding to 10 2011 079 654.1 mailed Jan. 23, 2012.
(Continued)

*Primary Examiner* — Paul N Dickson
*Assistant Examiner* — Timothy Wilhelm
(74) *Attorney, Agent, or Firm* — Davis & Bujold, PLLC; Michael J. Bujold (57) ABSTRACT

A four-point link for the suspension of a rigid axle which has four bearing seats. Two bearing seats can be articulated on the axle and two can be articulated on the vehicle frame. The link has a single-piece link body which is inscribed by the trapezoid formed by the bearing seats. The link body is formed of a fiber-composite arrangement that comprises at least one longitudinal fiber arrangement. The longitudinal fiber arrangement encases the bearing seat, at least along (Continued)

half circumference thereof and extends along at least a portion of the link body in order to optimize loading, reduce mass and increase its application. Torsional compliance makes it possible to use relatively small and/or hard rubber bearings for articulating the four-point link or the vehicle axle.

18 Claims, 4 Drawing Sheets

(51) Int. Cl.
  *B60G 9/00* (2006.01)
  *B60G 21/05* (2006.01)
(52) U.S. Cl.
  CPC ......... *B60G 21/05* (2013.01); *B60G 2200/314* (2013.01); *B60G 2206/121* (2013.01); *B60G 2206/7101* (2013.01); *B60G 2206/85* (2013.01)

(56) References Cited

U.S. PATENT DOCUMENTS

| | | | | |
|---|---|---|---|---|
| 5,746,441 | A * | 5/1998 | VanDenberg | 280/124.116 |
| 5,788,263 | A * | 8/1998 | VanDenberg | 280/124.116 |
| 6,129,367 | A * | 10/2000 | Bublies et al. | 280/124.107 |
| 6,308,971 | B1 * | 10/2001 | Mikaelsson et al. | 280/124.107 |
| 6,527,286 | B2 | 3/2003 | Keeler et al. | |
| 6,637,762 | B2 * | 10/2003 | Bublies et al. | 280/124.11 |
| 7,753,384 | B2 * | 7/2010 | Kunze et al. | 280/124.116 |
| 7,946,601 | B2 * | 5/2011 | Hughes | B60G 9/003 280/124.128 |
| 7,980,575 | B2 * | 7/2011 | Quaing | 280/124.116 |
| 8,814,187 | B2 * | 8/2014 | Pedersen et al. | 280/124.134 |
| 2002/0067017 | A1 | 6/2002 | Keeler et al. | |
| 2007/0194551 | A1 * | 8/2007 | Quill et al. | 280/124.157 |
| 2009/0184484 | A1 * | 7/2009 | Gerrard | 280/124.144 |

FOREIGN PATENT DOCUMENTS

| | | | |
|---|---|---|---|
| DE | 195 21 874 A1 | 12/1996 | |
| DE | 102 06 809 A1 | 9/2003 | |
| DE | 103 34 687 A1 | 2/2005 | |
| DE | 10 2004 014 610 A1 | 10/2005 | |
| DE | 10 2005 000 902 A1 | 7/2006 | |
| DE | 601 25 410 T2 | 10/2007 | |
| EP | 1057665 A1 * | 12/2000 | ............ B60G 9/00 |
| EP | 2 030 815 A1 | 3/2009 | |
| JP | 62-16501 U | 1/1987 | |
| JP | 63-11937 U | 1/1988 | |
| JP | H07-246815 A | 9/1995 | |
| JP | H10-503989 A | 4/1998 | |
| JP | 2003-267016 A | 9/2003 | |
| JP | 2004-203195 A | 7/2004 | |
| JP | 3821300 B2 | 9/2006 | |
| WO | 99/09563 A1 | 2/1999 | |
| WO | 2006/119101 A1 | 11/2006 | |

OTHER PUBLICATIONS

International Search Corresponding to PCT/EP2012/062134 mailed Jan. 24, 2013.

Written Opinion Corresponding to PCT/EP2012/062134 mailed Jan. 24, 2013.

Japanese Office Action to Corresponding Japanese Application No. 2014-520582 Mailed Jan. 20, 2016.

* cited by examiner

FOUR-POINT LINK

This application is a National Stage completion of PCT/EP2012/062134 filed Jun. 22, 2012, which claims priority from German patent application serial no. 10 2011 079 654.1 filed Jul. 22, 2011.

FIELD OF THE INVENTION

The invention relates to a four-point link for a suspension of a rigid axle, in particular of a utility vehicle.

BACKGROUND OF THE INVENTION

Four-point links of the initially described type are known from the prior art and are used, in particular, in trucks and other utility vehicles. The four-point links of the type in question combine a number of functions and tasks in one component, for which a plurality of links or components in the region of the axle guide were previously required.

For example, the use of a four-point link eliminates the need, inter alia, for additional anti-roll bars for the anti-roll stabilization of the vehicle body, since the four-point link, together with the available trailing arms, can perform the task of guiding the axle in the transverse and longitudinal directions, and the task of providing torque support and anti-roll stabilization. The three-point links that are otherwise needed for axle guidance can also be omitted.

Proceeding therefrom, forged four-point links, which are created from multiple metal sheets or are designed as a cast part, are known from the prior art, for example from DE 195 21 874, DE 102 06 809, or DE 10 2004 014 610. In the case of the forging process, however, for reasons related to production, there is usually a massive rectangular cross-section for the arms of the four-point link, which results in heavy component weight and production costs that are too high, and, therefore, to increased fuel consumption and a reduced maximum load of the utility vehicle.

Assembled or welded and cast four-point links are also heavy and are expensive to produce. In the case of four-point links made of metal, in particular, the compliances required for an axle suspension are difficult to implement, which is why these must be implemented, to a large extent, by rubber bearing elements, which must be sized accordingly, having large volumes and different radial rigidities in different load directions. Due to the great deformations that occur as a result, these rubber bearings tend to wear, however, and may need to be replaced prematurely.

SUMMARY OF THE INVENTION

Proceeding therefrom, the problem addressed by the present invention is that of creating a four-point link, with which the aforementioned limits of the prior art of the type in question can be overcome. The four-point link enables weight to be markedly reduced, in particular, as compared to known metallic embodiments, permits greater flexibility in terms of design and integration of the bearing and connection points on the axle and chassis, and furthermore allows for the use of relatively small and/or relatively harder rubber bearings, enables improved vibration damping as compared to four-point links made of metal, and provides better corrosion resistance as compared to four-point links made of metal, and places fewer requirements on the surface protection during use.

This problem is solved by a four-point link having the features described below.

The four-point link provided for the suspension or guidance of a rigid axle of a utility vehicle, in particular, comprises four bearing seats for connection to the axle or chassis, wherein two bearing seats can be articulated on the vehicle axle and two bearing seats can be articulated on the vehicle frame. The four-point link comprises a link body, wherein the link body is inscribed by the trapezoid formed by the bearing seats and can be twisted (at least slightly), by axle twists, for example, in order to absorb chassis movements or chassis loads.

The four-point link is characterized in that the link body is formed of a fiber-composite arrangement. The fiber-composite arrangement comprises at least one longitudinal fiber arrangement, which is dedicated to at least one bearing seat. Preferably, one longitudinal fiber arrangement is dedicated to each of the four bearing seats of the four-point link. The at least one longitudinal fiber arrangement encases the at least one bearing seat at least along half the circumference thereof and likewise extends along at least parts of the link body.

A longitudinal fiber arrangement is intended to refer to an anisotropic fiber arrangement, such as a fiber fabric, a non-woven fabric, or a knitted fabric, for example, in which the fibers contained therein are disposed primarily (at least ¾ of the fiber mass) unidirectionally in the longitudinal direction of the fabric, the non-woven fabric, or the knitted fabric, thereby resulting in a high modulus of elasticity and high load-bearing capacity, in particular in the longitudinal direction of the longitudinal fiber arrangement.

In this manner, it is possible to obtain four-point links made of a fiber-composite material that are considerably more lightweight than the known embodiments made of metal, which withstand the loads that occur during operation, in particular in the case of axle suspensions of utility vehicles, and simultaneously satisfy the comprehensive set of requirements specified above. In this case, the at least one longitudinal fiber arrangement dedicated to the bearing seats of the four-point link, and the extension thereof, at least along half the circumference of the bearing seat and, likewise, along at least parts of the link body, in particular, ensures that the considerable forces and torques occurring in the region of the bearing seats can be introduced via the longitudinal fiber arrangement into the link body in a load-optimized manner and across a large area.

According to a preferred embodiment, the four-point link is characterized by two longitudinal fiber arrangements, one of which in each case is dedicated to one of the two bearing seat pairs of the four-point link disposed diagonally opposite one another.

In other words, this embodiment relates to two longitudinal fiber arrangements, which are disposed substantially crosswise on the link body or which substantially form the link body, for example, unidirectional bands made of a fiber-composite material, each of which connects two bearing seat pairs, which are disposed diagonally opposite one another, to one another and, simultaneously, to the link body. This embodiment can be obtained, in terms of production, by means of a winding technique, for example, in which the unidirectional fiber bands or "prepreg" layers (fabric or fiber arrangements pre-impregnated with matrix material) are wound crosswise over a core and/or over the bearing seats, which have been fixed accordingly in a winding device. In this case, a winding pattern of the bands or prepregs, preferably one over the other in alternation and then over the other bearing seat pair located diagonally opposite thereto, results in a particularly tight and solid connection of the two longitudinal fiber arrangements in the region of the crossing point thereof, and therefore results in high load-bearing capacity and a high endurance limit of a thusly designed four-point link.

According to a further preferable embodiment of the invention, a single longitudinal fiber arrangement is dedicated to all four bearing seats of the four-point link. This embodiment can also be obtained by means of a suitable winding technique, in which a single, substantially unidirectional fiber band or prepreg is guided or wound such that all four bearing seats are encased by the winding. In a similar manner, in other words, by means of a suitable winding pattern, the entire link body can also be formed of a single longitudinal fiber arrangement, thereby resulting in a cost-effective design of lightweight and high-strength four-point links.

According to a preferred embodiment, the link body, in entirety, forms a closed profile. In this manner, high torsional and flexural rigidity for the four-point link is obtained—specifically in the case of the fiber-composite materials used here, which, specifically, are typically less stiff—since the shear forces occurring during torsion or bending can be well-supported in the closed profile. According to a further embodiment of the invention, the link body of the four-point link comprises at least one stem (in the interior space of the link body). In this case, the stem connects opposing walls of the link body to one another in a shear-resistant manner. A "shear-resistant" connection of opposing walls of the link body is present, within the scope of the invention, when walls thusly connected by means of a stem cannot undergo relative movements extending parallel to one another, which would be possible otherwise if the stem were not present.

It is therefore possible to further increase the torsional rigidity, in particular, of the four-point link, and to specifically set this torsional rigidity depending on the arrangement, dimensions, and extension direction of the stem. Instead of in addition to one or more stems, the link body can also be provided with load-oriented ribbing on the inner surface and/or on the outer surface.

According to a further preferred embodiment of the invention, the four-point link is filled, at least in regions, with a filling body made of a shear-resistant filler material. The filler body is preferably connected to the walls of the link body in a shear-resistant manner. In this manner, in other words, by applying the sandwich principle, a four-point link can be obtained that has minimal weight and is particularly flexurally rigid and, possibly, torsionally rigid. In particular, the use of a filler body makes it possible to keep the walls of the four-point link thin (minimal wall thickness; therefore, substantially designed and dimensioned for tensile loads), since the filler body effectively prevents the bulging and buckling resulting from pressure loads into the walls.

Furthermore, a specific selection of the material properties of the filler body may also make it possible to subsequently adjust the rigidity such that one and the same four-point link body can be provided (by means of foaming, for example) with different rigidities in each case, in particular torsional rigidities. In this manner, a four-point link can be adapted in a relatively cost-effective manner for use in different vehicles, without making any noteworthy changes to the geometry, tools, or the composite materials used.

According to a further preferred embodiment, the link body forms a profile that is open at least on one side in the transverse direction of the vehicle and/or in the longitudinal direction of the vehicle. A design of the link body that is open on both sides, in the transverse direction of the vehicle and in the longitudinal direction of the vehicle, can also be expedient. Such a geometrically open design of the four-point link body results in simpler and more cost-effective production, for example without the need to use a lost core. In addition, increased torsional and/or longitudinal compliance of the link can be achieved in this manner, by definition. As a result, defined axle guidance tasks, for example anti-roll stabilization, can be performed by the link body itself to a greater extent, which is why, for example, elastomeric bearings having a relatively smaller volume can be used, and the elastomeric bearings are deformed to a lesser extent by rolling motions, in particular, and, therefore, obtain a longer service life.

According to a further embodiment, a profile of the link body that is open on both sides, in the transverse direction of the vehicle and in the longitudinal direction of the vehicle, can be obtained by composing the link body of two separately produced shell halves. This embodiment is associated primarily with cost-effective production, which, in particular, can involve two substantially flat structures, as shell halves, and the subsequent joining thereof.

According to a further embodiment of the invention, the link body comprises at least one variable-length spacer between two opposing walls of the link body. In this manner, the rigidity of the link body can also be increased in that the opposing walls are connected to one another (similar to the case of a stem or a filling body) and are thereby strengthened. In addition, by changing the length of the spacer, for example, by means of an actuator or a motor, the separation between the opposing walls or the curvature thereof—and, therefore, the characteristics and rigidity of the link—can be adjusted or changed.

According to a further embodiment of the invention, the link body forms, as viewed from above relative to the vehicle, a substantially single-piece, cross-shaped or X-shaped configuration having a central body portion and four peripheral suspension arms, wherein each suspension arm carries or can carry one of the bearing seats. In this case, the suspension arms are designed as flexible supports, which have a profiled cross section, wherein the cross-sectional shape of these flexible supports substantially corresponds to a box profile or an I-beam. In this manner, the desired link rigidities, in particular the structurally-imparted torsional compliance of the four-point link, can be adjusted within wide limits. In addition, the design of the suspension arms as profiled flexible supports structurally counteracts the usually greater elasticity (the lower modulus of elasticity) of fiber-composite materials as compared to metals.

A further preferred embodiment of the invention relates to a four-point link, in which the two bearing seats of the bearing seat pairs disposed on the left and on the right relative to the vehicle are each rigidly connected to one another by means of a torsion tube. In this case, the torsion tube is preferably made of metal, wherein the two bearing seats of a left or right bearing seat pair, which are connected to one another by means of the torsion tube, can also be designed as a single piece with the torsion tube, for example being welded to the torsion tube. In this manner, the torsional rigidity, in particular, and/or the longitudinal rigidity of the four-point link can be increased, in the installed state, along the direction of travel, while the torsional compliance of the four-point link remains largely unaffected.

According to a further preferred embodiment, a bearing sleeve or an elastomeric bearing, as a prefabricated part, is laminated into at least one, preferably all, bearing seats of the four-point link. In this manner, the high expenditure for the machining to form the bearing sleeve for the subsequent accommodation of an elastomeric bearing is eliminated, in particular, as is the expenditure required to first install a separate bearing sleeve into each suspension arm and to then install the associated elastomeric bearing in each case.

In this case, the at least one bearing sleeve is preferably designed as a single piece with the link body or with the suspension arms. This results in a cost-effective embodiment of the four-point link in that this four-point link also already comprises the bearing sleeves, as a single piece, whereby it must be possible to insert elastomeric bearings, in particular, directly into the plastic body, without requiring or needing to install additional, in particular metallic, bearing sleeves.

According to a further preferred embodiment of the invention, at least one of the bearing seats, preferably a plurality of or all bearing seats, are designed to accommodate non-elastic, rotational joints for connecting the four-point link to vehicle axles or vehicle frames.

In this manner a four-point link can be obtained that can be connected, in part or in entirety, to vehicle axles or vehicle frames without the need for elastomeric joints. Instead of elastomeric joints, it is then possible to use rotational slide bearings (i.e. non-elastic joints, in contrast to elastomeric bearings), for example, to connect the four-point link to vehicle axles or vehicle frames. In this embodiment, the elastic function of the thereby omitted elastomeric joints (resilience, vibration damping) is therefore performed or implemented by the four-point link itself, which—in contrast to the metallic four-point links from the prior art—is made possible only by forming the four-point link of a fiber-composite material.

According to a further embodiment of the invention, the four-point link is characterized in that at least one, preferably a plurality of, or all, bearing seats or suspension arms are designed to be connected to the vehicle axle or the vehicle frame in a non-articulated manner. In this embodiment, the four-point link is connected to the vehicle axle or the vehicle frame entirely without joints. In this case, therefore, the four-point link itself performs not only the elastic function of the (already omitted) elastomeric joints, but also implements the rotational mobility of the slide bearings (which are also omitted in this embodiment).

In other words, this embodiment makes it possible to connect the four-point link directly, pivotably to the chassis of a motor vehicle, for example, without the need for bearing elements such as elastomeric joints or slide bearings. Instead, the at least one flexurally resilient bearing section of the link element itself performs the task of the swivellable mounting of the link element in respect of the connection assembly, for example in respect of the vehicle chassis or the vehicle axle. As a result, production and assembly expenditure, in particular, as well as corresponding scopes of costs, and component mass and construction space requirements can be reduced by a considerable extent.

Preferably, the non-articulated connection of the four-point link to the axle and/or chassis is implemented by designing the link body or the suspension arms to be flexurally elastic in the region of the at least one bearing seat, preferably in the form of a laminate, which comprises at least one laminate layer made of an elastomeric material. In this manner, a single-piece transition between the substantially rigid regions of the four-point link and the suspension arms of the four-point link, which are flexurally elastic, at least at the ends, wherein, in this embodiment, these suspension arms of the four-point link therefore perform the task of the elastic connection as well as the articulated connection to the axle or to the vehicle chassis.

BRIEF DESCRIPTION OF THE DRAWINGS

The invention is explained below in greater detail with reference to drawings that merely depict examples of embodiments. In the drawings.

DETAILED DESCRIPTION OF THE PREFERRED EMBODIMENTS

Figures 1, 2:
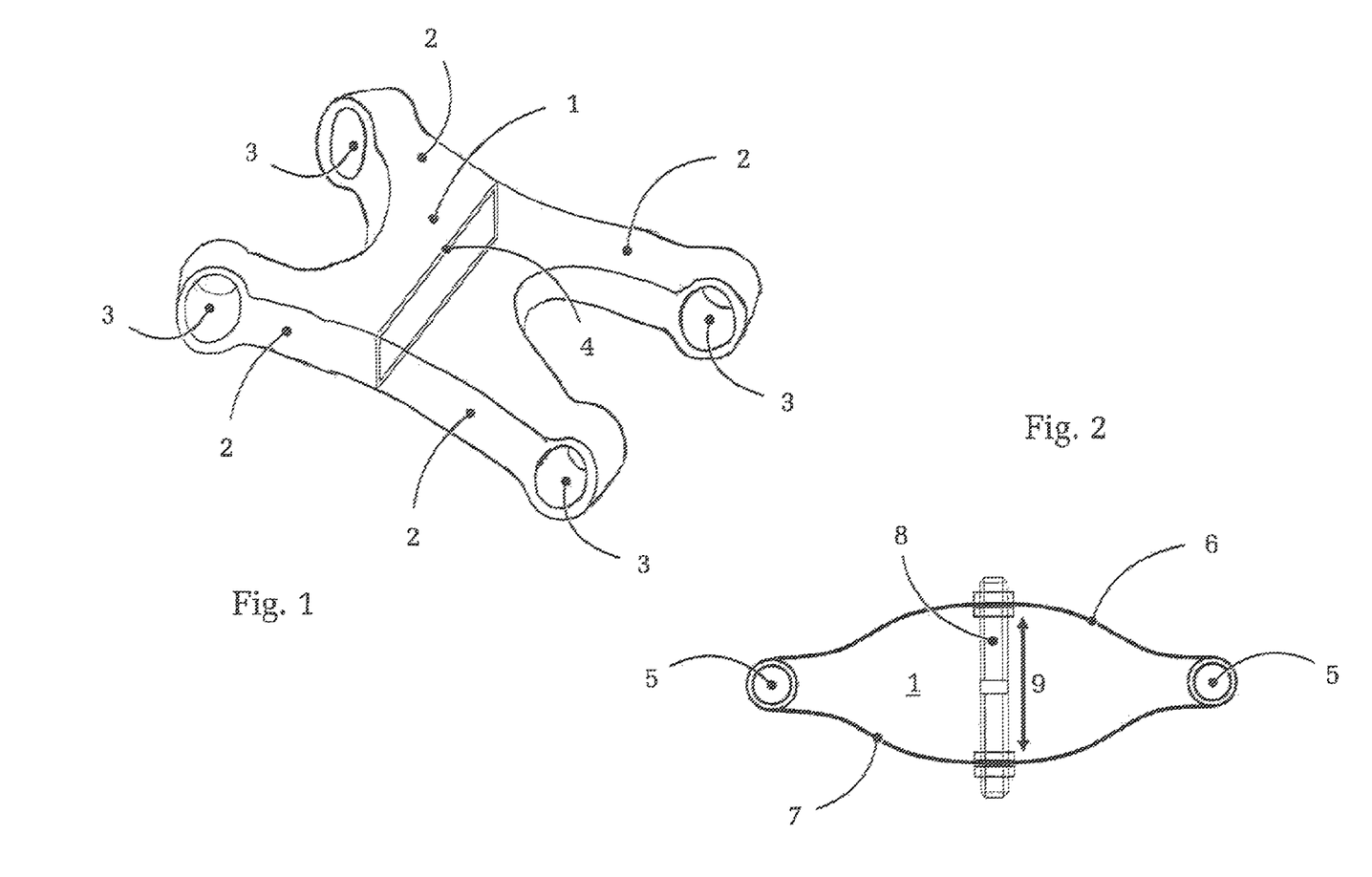
FIG. 1: shows a four-point link according to an embodiment of the present invention in a schematic, isometric representation.
FIG. 2: shows a cross section of the link body of a further embodiment of a four-point link according to the present invention, having a variable-length spacer.

FIG. 1 shows a four-point link according to the present invention, in a schematic, isometric representation. Clearly shown is a body portion 1, to which four suspension arms 2 are integrally connected, wherein each suspension arm 2, in turn, integrally transitions into a bearing seat 3.

The box-shaped cross section 4 of the body portion 1 of the four-point link is also shown in FIG. 1. The four-point link depicted in FIG. 1 therefore forms a large-volume, hollow body having a box-shaped cross section 4, wherein the bearing seats 3 are integrated into the four-point link as a single piece. In this manner—and given that the four-point link shown is produced from a fiber-composite material having the specifically oriented or disposed fiber layers—the requirements such as weight reduction, a load-oriented design, specific compliances in respect of bending, longitudinal force or torsion, and the possibility to integrate elastomeric layers or joints are implemented. The characteristic arrangement of the longitudinal fibers or unidirectional reinforcements, which encase the bearing seats 3 at least along half the circumference thereof, and likewise extend along at least parts of the link body 1, 2, is not shown specifically in FIG. 1, for purposes of clarity; refer, in particular, to FIG. 3 and the associated description. Depending on the embodiment, the longitudinal fibers or unidirectional reinforcements are applied in addition to the basic laminate of the hollow body, or alone.

FIG. 2 shows the cross section through a four-point link having a body portion 1 and walls 6, 7 according to a further embodiment of the invention. In the case of this four-point link, tubes 5 are incorporated, as reinforcements, on the sides, in the longitudinal direction of the body portion 1. In addition, the four-point link according to FIG. 2 comprises a spacer 8, which is designed as a threaded rod in this case and maintains a constant separation between the two walls 6, 7 of the body portion 1. The clear result thereof is a reinforcing effect, since the spacer 8 largely prevents bulging movements of the walls 6, 7, in particular in the event of torsional loading of the four-point link.

In addition, the characteristics or rigidity of the four-point link can be changed by changing the effective length 9 of the spacer 8. For example, increasing the height 9 of the body portion 1 changes the curvature of the two walls 6, 7 as well as the geometrical moment of inertia of the cross section of the four-point link shown, with corresponding consequences for the extent of the flexural or torsional rigidity of the body portion 1. In addition, increasing the spacing 9 between the two walls 6, 7 results in a preloading of the walls 6, 7 as well as a preloading of the suspension arms 2 (not shown in FIG. 2; refer to FIG. 1) in respect of bending.

The latter also has corresponding effects on the overall torsional rigidity of the four-point link, wherein a different curvature of the walls 6, 7 also affects the longitudinal compliance of the four-point link, in the installed state, along the direction of travel. A four-point link according to FIG. 2 having a changeable spacer can therefore be easily adapted for different intended uses, for example for use in different vehicles or vehicle classes.

Figure 3:
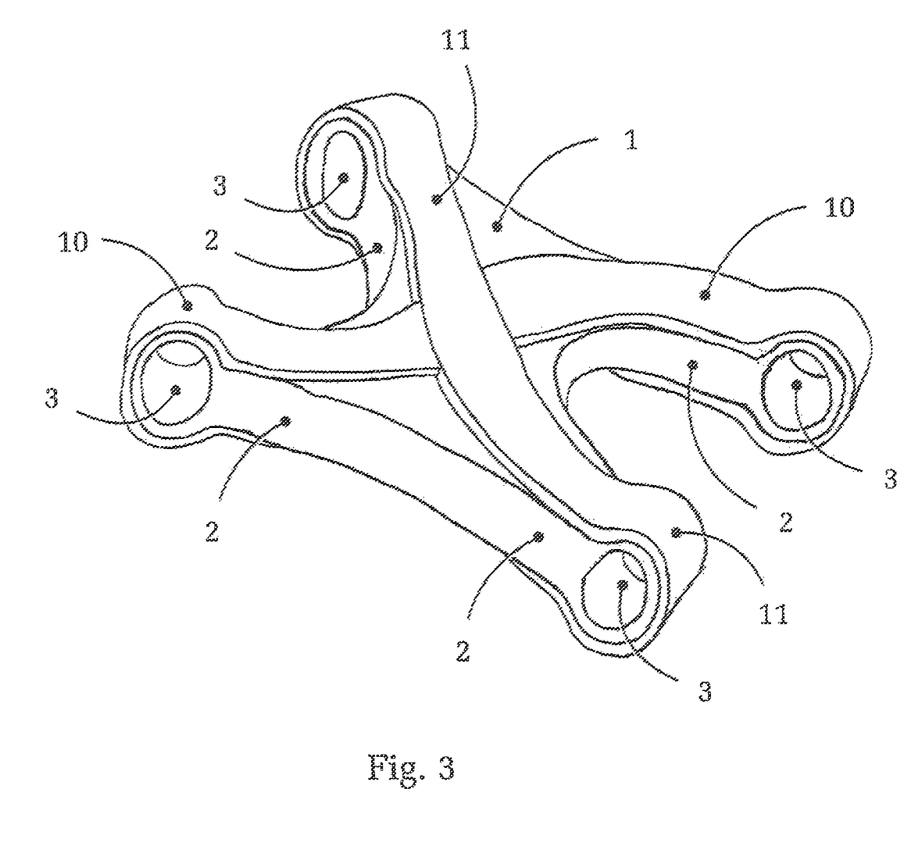
FIG. 3: shows, in a representation and view corresponding to FIG. 1, a four-point link according to a further embodiment of the present invention having unidirectional layers or longitudinal fiber windings disposed in a crosswise manner.

FIG. 3 shows a four-point link similar to that represented in FIG. 1, having a body portion 1, four suspension arms 2, and four bearing seats 3, wherein the body portion 1, suspension arms 2, and bearing seats 3, in turn, are formed as a single piece of a fiber-composite material. FIG. 3 also shows a preferred embodiment of the arrangement of longitudinal fiber strands or unidirectional prepregs 10, 11.

In the embodiment shown, the four-point link therefore clearly comprises a main body (which can likewise contain unidirectional fiber arrangements that are already disposed in a load-optimized manner, wherein this is not shown separately) formed by the body portion 1, the suspension arms 2, and the bearing seats 3, and is formed by the unidirectional fiber strands 10, 11 disposed on the main body in the form of windings or bands. The windings or fiber strands 10, 11 connect two diagonally opposed bearing seats 3 in each case, in particular, by covering the respective bearing seat 3 (along an extension greater than half the outer circumference thereof) and therefore encase these bearing seats in a form-locking manner. In other words, this also means that the longitudinal fibers come to rest in the circumferential direction of the bearing seat and are therefore disposed in a load-optimized manner in respect of force introduction into the link body 1, 2.

Due to the orthotropic material properties of the unidirectional fiber strands 10, 11—which, in other words, have different rigidities (modulus of elasticity) and different strengths in different directions—the four-point link can therefore be configured to be optimized in terms of deformation and load. Therefore, the longitudinal and torsional forces occurring at the vehicle axle can be introduced into the chassis, and the torsions occurring during chassis twists or cornering can also be absorbed by a corresponding deformation of the link.

The material of the unidirectional fiber strands 10, 11 can be, in particular, carbon fibers, glass fibers, or a combination of these fibers, wherein the fibers are disposed accordingly to conform with the direction of loading by means of winding, draping, or weaving. The latter applies for the fiber strands 10, 11 as well as for the body portion 1 itself, and for the suspension arms 2 and bearing seats 3 integrally formed thereon.

Figure 4:
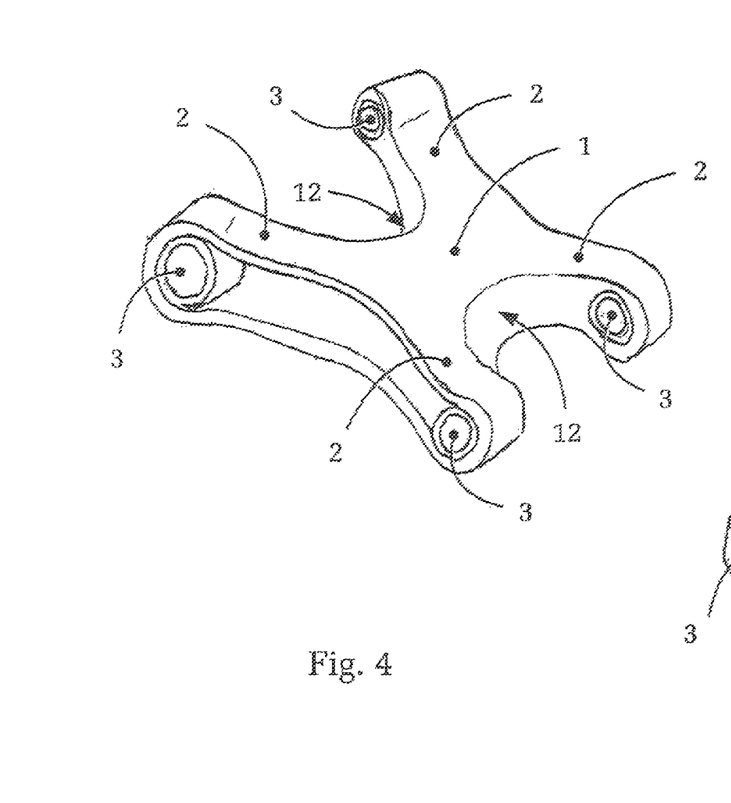
FIG. 4: shows, in a representation and view corresponding to FIGS. 1 and 3, a four-point link according to a further embodiment of the present invention having a link body open in the transverse direction.
Figure 5:
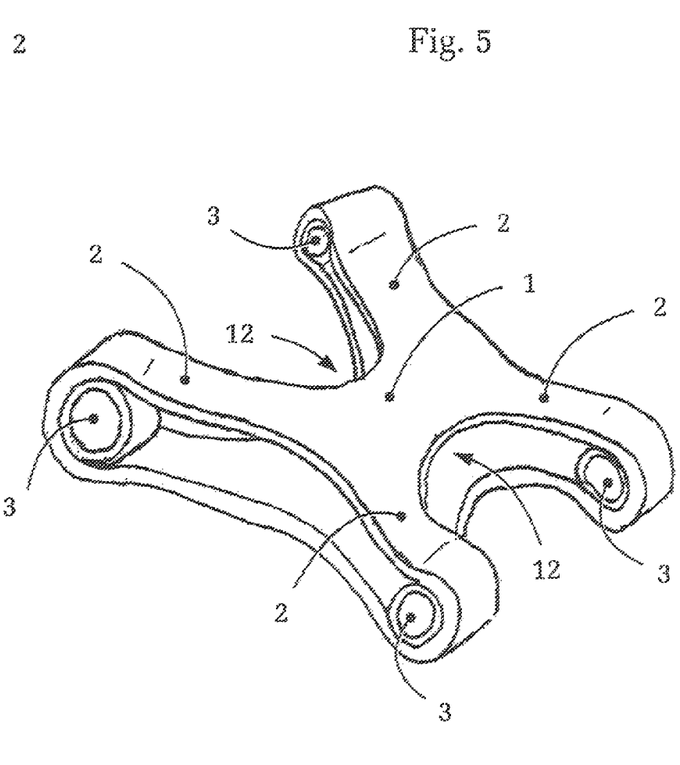
FIG. 5: shows, in a representation and view corresponding to FIGS. 1, 3 and 4, a four-point link according to a further embodiment of the present invention having a link body open in the transverse and longitudinal directions.

FIGS. 4 and 5 show two further embodiments of four-point links according to the present invention. FIG. 4 shows a four-point link having a body portion 1, suspension arms 2, and bearing seats 3, in which the body portion 1 has an open design in the transverse direction of the vehicle, while the body portion 1 comprises closed walls 12 in the longitudinal direction of the vehicle. In the case of the four-point link according to FIG. 4 as well, the bearing seats 3 are also integrated into the link body formed of longitudinal fiber arrangements or into the suspension arms 2 formed as a single piece with the link body such that the fiber orientations (not shown in FIG. 4; refer to FIG. 3) encase the bearing seat at least along half the outer circumference thereof and are therefore fixedly anchor the bearing seat in the four-point link.

Due to the design of the body portion 1 so as to be open in the transverse direction of the vehicle, the four-point link according to FIG. 4 has a greater compliance in respect of torsional deformation in particular, and is therefore particularly suitable for installation in relatively lightweight vehicles, given lower requirements on anti-roll stabilization and/or higher requirements in terms of the maximum axle twist.

In the four-point link represented in FIG. 5, the body portion 1 is designed to be open in the transverse direction of the vehicle and in the longitudinal direction of the vehicle (at 12), which results in an even greater torsional compliance as well as longitudinal compliance of the body portion 1 and of the suspension arms 2.

As a result, a four-point link according to FIG. 5, for example, can perform the tasks that were previously performed, basically, by the elastomeric bearings to be disposed in the bearing seats 3, such as radial and axial elasticity, as well as vibration damping, in part or, possibly, in entirety, thereby making it possible to use smaller and more lightweight elastomeric bearings, or to even eliminate the need for elastomeric bearings entirely. This means, in other words, that the four-point link can therefore even be connected, mutatis mutandis, directly to the vehicle chassis and/or to the vehicle axle by means of slide bearings. Construction space, weight, and costs are spared as a result, while, simultaneously, an even further-reaching functional integration is achieved in terms of the four-point link and the axle system.

Figure 6:
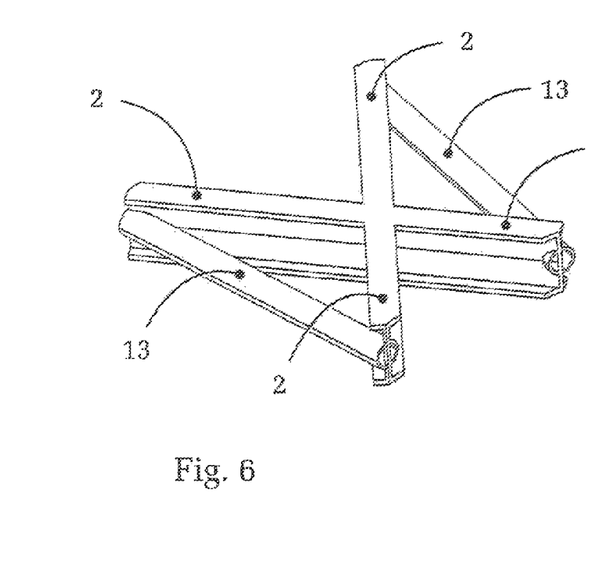
FIG. 6: shows, in a schematic, isometric representation, the link body of a four-point link according to a further embodiment of the invention, in a framework design having torsion tubes.

FIG. 6 shows, in an isometric representation, the link body of a further embodiment of the four-point link according to the present invention. The bearing seats are not shown in FIG. 6, in order to show the design of the link body represented in FIG. 6. The link body is clearly designed as a framework structure comprising two bars, which are disposed in the shape of a cross and form the suspension arms 2, and comprising two torsional tubes 13. The torsional tubes 13 extend (in the installed state of the four-point link) in the longitudinal direction of the vehicle and each connect the two bearing seats, as pairs, of the bearing seat pairs disposed on the left or right relative to the vehicle (cf. also FIG. 7).

In the four-point link according to FIG. 6, the bars 2 and the torsional tubes 13 are also made of a fiber-composite material. Due to the framework design of the bars 2 and the torsional tubes 13, the torsional rigidity or the deformation of the four-point link in the event of torsional loading is converted into a deflection of the bars 2. The torsional rigidity of the four-point link can therefore be depicted on or traced back to the flexural rigidity of the bars 2 and to the rigidity in the region of the crossing point of the bars 2.

Figure 7:
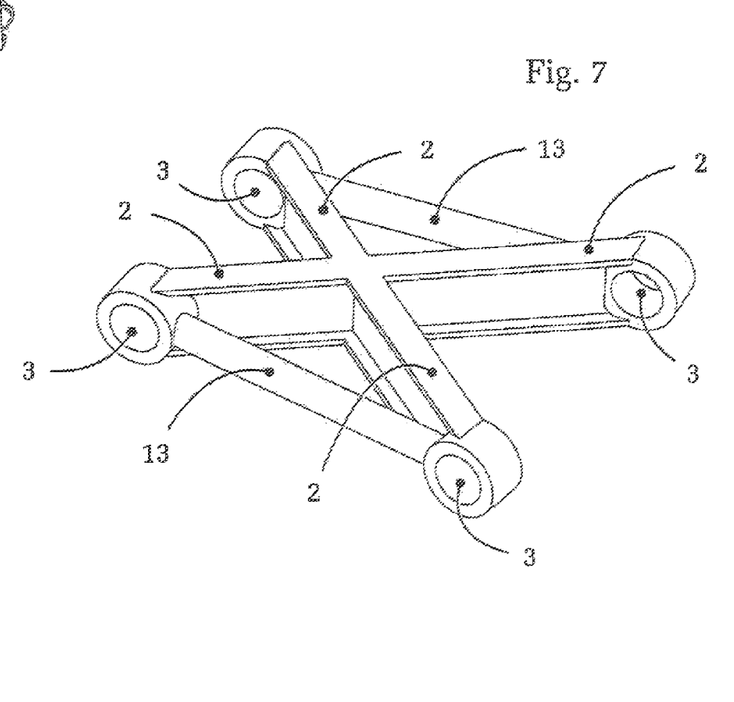
FIG. 7: shows, in a representation and view corresponding to FIG. 6, a further four-point link, in a hybrid framework design having torsion tubes made of steel.

Longitudinal forces acting in the direction of travel, however, are absorbed by the torsion tubes 13, which have tensile and compression rigidity, and therefore the longitudinal rigidity or longitudinal compliance of the four-point link according to FIG. 6 or 7 is defined mainly by the torsion tubes 13. Lateral forces acting transversely to the direction of travel, however, are supported in the form of tensile and compression forces in the bars 2, via the crosswise arrangement of the bars 2 and the incorporation of the four-point link into the chassis.

The four-point link according to FIG. 7 is also designed as a type of framework structure, similar to the four-point link according to FIG. 6. In contrast to FIG. 6, the bearing seats 3 are shown in FIG. 7. In the four-point link according to FIG. 7, the torsion tubes 13 are also made of steel and are designed as a single piece with the respectively dedicated bearing seat pairs 3. The torsional rigidity, in particular, and/or the longitudinal rigidity of the four-point link is further increased along the direction of travel due to the single-piece design of the bearing seats 3, namely on a longitudinal side of the four-point link relative to the vehicle in each case, while the torsional behavior of the four-point link is still determined primarily by the link body 1, which is also designed in the form of a fiber-composite arrangement in this case.

REFERENCE CHARACTERS

1 body portion
2 suspension arm, flexible support
3 bearing seat
4 cross-sectional shape
5 reinforcing tube
6, 7 wall
8 spacer
9 body height
10, 11 fiber strand, prepreg, longitudinal fiber arrangement
12 wall region
13 Torsion tube

The invention claimed is:

1. A four-point link for an axle suspension of a rigid axle of a vehicle, the four-point link comprising:
   four bearing seats (3) of which two bearing seats (3) are pivotable on the axle and two bearing seats (3) are pivotable on a frame of the vehicle, at least one of the four bearing seats is aligned in a longitudinal direction of the vehicle,
   a twistable link body (1, 2) having lateral side edges and a laterally intermediate region centrally located between the side edges, the link body is substantially inscribed by a trapezoid formed by the four bearing seats (3), and the link body (1, 2) being a fiber-composite arrangement formed of a fiber material in which at least three quarters of a mass of fibers of the fiber material are aligned in the longitudinal direction of the vehicle, the link body having an upper surface and an opposed lower surface that are spaced from one another such that a space between the upper and the lower surfaces in the intermediate region is at least as great as a space between the upper and the lower surfaces at the side edges of the link body,
   the fiber-composite arrangement comprising two longitudinal fiber arrangements (10, 11), each of which is dedicated to at least one bearing seat (3), and each of the two longitudinal fiber arrangements (10, 11) encases at least along half a circumference of the at least one bearing seat (3) and extends along at least part of the link body (1, 2), and
   the link body (1, 2) forms, when viewed from above relative to the vehicle, either a substantially single-piece, cross-shaped or X-shaped configuration having a central body portion (1) and four peripheral suspension arms (2) which each support one of the bearing seats (3), the suspension arms (2) are designed as flexible supports (2), the central body portion and the four peripheral suspension arms are formed by the two longitudinal fiber arrangements that are wound over each other in alternation and the bearing seats.

2. The four-point link according to claim 1, wherein the fiber-composite arrangement comprises first and second longitudinal fiber arrangements (10, 11), the first longitudinal fiber arrangement (10, 11) is dedicated to a first one of two bearing seat pairs (3) and the second longitudinal fiber arrangement (10, 11) is dedicated to a second one of the two bearing seat pairs (3) such that the first and the second longitudinal fiber arrangements (10, 11) are disposed diagonally opposite one another.

3. The four-point link according to claim 1, wherein the two longitudinal fiber arrangements (10, 11) are dedicated to all four of the bearing seats (3), or an entirety of the link body (1, 2) is formed by the two longitudinal fiber arrangements.

4. The four-point link according to claim 1, wherein the link body (1, 2) forms a profile having an opening that passes, in the longitudinal direction, completely through the four-point link between the lateral side edges and the upper and the lower surfaces.

5. The four-point link according to claim 1, wherein the upper and the lower surfaces are formed by opposing walls, and the link body (1, 2) comprises at least one stem which connects the opposing walls (6, 7) of the link body (1, 2) to one another in a shear-resistant manner.

6. The four-point link according to claim 1, wherein the link body (1, 2) is filled, at least in regions, with a filling body made of a shear-resistant filler material, and the fibers of the fiber material comprise at least one of carbon fibers and glass fibers, and the fiber-composite arrangement is formed by either a fiber fabric, a non-woven fabric, or a knitted fabric.

7. The four-point link according to claim 6, wherein the upper and the lower surfaces are formed by opposing walls, and the filling body is connected to the opposing walls (6, 7) of the link body (1, 2) in a shear-resistant manner.

8. The four-point link according to claim 1, wherein the link body (1, 2) forms a profile that is open and forms a passage that extends completely through the four-point link in a lateral direction of the vehicle and in the longitudinal direction of the vehicle.

9. The four-point link according to claim 1, wherein either a bearing sleeve or an elastomeric bearing, as a prefabricated part, is laminated into a respective one of the bearing seats (3).

10. The four-point link according to claim 1, wherein a bearing sleeve, as a prefabricated part, is laminated into a region of at least one of the bearing seats (3) and the at least one bearing sleeve is formed as a single piece with either the link body or the suspension arms (2).

11. The four-point link according to claim 1, wherein at least one bearing seat (3) is designed to accommodate a non-elastic, rotational joint for connecting the four-point link to either the axle or the frame of the vehicle.

12. The four-point link according to claim 11, wherein either the link body (1, 2) or the suspension arms (2) are designed to be flexurally resilient in a region of at least one of the bearing seats (3).

13. The four-point link according to claim 12, wherein the flexurally resilient region of either the link body (1, 2) or the suspension arms (2) are designed as laminate, and the laminate comprises at least one laminate layer made of an elastomeric material.

14. The four-point link according to claim 1, wherein either at least one of the bearing seats (3) or at least one of the suspension arms (2) connects the four-point link, in a non-articulated manner, to either the axle or the frame of the vehicle.

15. A four-point link for an axle suspension of a rigid axle of a vehicle, the four-point link comprising:
    four bearing seats (3) of which two bearing seats (3) are pivotable on the axle and two bearing seats (3) are pivotable on a frame of the vehicle, at least one of the four bearing seats is aligned in a longitudinal direction of the vehicle,
    a twistable link body (1, 2) having lateral side edges and a laterally intermediate region centrally located between the side edges, the link body is substantially inscribed by a trapezoid formed by the four bearing seats (3), and the link body (1, 2) being a fiber-composite arrangement formed of a fiber material in which at least three quarters of a mass of fibers of the fiber material are aligned in the longitudinal direction of the vehicle, the link body having an upper surface and an opposed lower surface that are spaced from one another such that a space between the upper and the lower surfaces in the intermediate region is at least as great as a space between the upper and the lower surfaces at the side edges of the link body,
    the fiber-composite arrangement comprising at least one longitudinal fiber arrangement (10, 11) which is dedicated to at least one bearing seat (3), and the at least one longitudinal fiber arrangement (10, 11) encases at least along half a circumference of the at least one bearing seat (3) and extends along at least part of the link body (1, 2), and
    the link body (1, 2) forms a profile having a first open passage that extends in a lateral direction of the vehicle completely through the four-point link between the upper and the lower surfaces, and a second open passage that extends in the longitudinal direction of the vehicle completely through the four-point link between the lateral side edges and the upper and the lower surfaces.

16. A four-point link for an axle suspension of a rigid axle of a vehicle, the four-point link comprising:
    four bearing seats (3) of which two bearing seats (3) can be articulated on the axle and two bearing seats (3) can be articulated on a frame of the vehicle;
    a twistable link body (1, 2) which is substantially inscribed by a trapezoid formed by the four bearing seats (3), and the link body (1, 2) being formed of a fiber-composite arrangement;
    the fiber-composite arrangement comprising at least one longitudinal fiber arrangement (10, 11) which is dedicated to at least one bearing seat (3), and the at least one longitudinal fiber arrangement (10, 11) encases at least along half a circumference of the at least one bearing seat (3) and extends along at least part of the link body (1, 2); and
    the link body (1, 2) comprises at least one variable-length spacer (8) located between two opposing walls (6, 7) of the link body (1, 2).

17. The four-point link according to claim 16, wherein the four bearing seats (3) comprise first and second bearing seat pairs, the first bearing seat pair is disposed on a left side, relative to the vehicle, and the second bearing seat pair is disposed on a right side, relative to the vehicle, and the bearing seats of the first bearing seat pair are rigidly connected to one another by a first torsion tube (13), and the bearing seats of the second bearing seat pair are rigidly connected to one another by a second torsion tube, and at least a portion of each of the first and the second torsion tubes is spaced from the link body by a respective gap.

18. The four-point link according to claim 17, wherein the first and the second torsion tubes (13) are made of metal and the bearing seats (3) of the first bearing seat pair, which are connected to one another by the first torsion tube (13), are formed as a single piece with the torsion tube (13).

\* \* \* \* \*